United States Patent [19]

Christensen et al.

[11] 4,248,897
[45] Feb. 3, 1981

[54] PROCESSED BLUE CHEESE BLEND AND METHOD OF FORMATION

[75] Inventors: Lyle S. Christensen, Thorp, Wis.; Ocrel M. Russel, Pescadero, Calif.

[73] Assignee: Patent Technology, Inc., San Francisco, Calif.

[21] Appl. No.: 969,317

[22] Filed: Dec. 14, 1978

[51] Int. Cl.³ .................................................. A23C 9/12
[52] U.S. Cl. ........................................ 426/36; 426/582
[58] Field of Search ......................... 426/582, 36, 605

[56] References Cited

U.S. PATENT DOCUMENTS

| 2,743,186 | 4/1956 | Kraft et al. | 426/582 |
| 3,337,347 | 8/1967 | Kichline et al. | 426/582 |
| 3,667,968 | 6/1972 | Kasik et al. | 426/582 |

FOREIGN PATENT DOCUMENTS 807621 1/1959 United Kingdom ..................... 426/582

Primary Examiner—Raymond N. Jones
Assistant Examiner—George C. Yeung
Attorney, Agent, or Firm—Flehr, Hohbach, Test, Albritton & Herbert

[57] ABSTRACT

A method for forming a processed blue cheese in which an aged blue cheese is blended with a current or partially mold-ripened blue cheese and, optionally, cheddar cheese. The blend is pasteurized in molten form. The resulting process blue cheese blend has extended refrigerated shelf-life without the off-flavor normally associated with heated blue cheese. It is particularly suitable for use in a blue cheese-type salad dressing.

10 Claims, 2 Drawing Figures

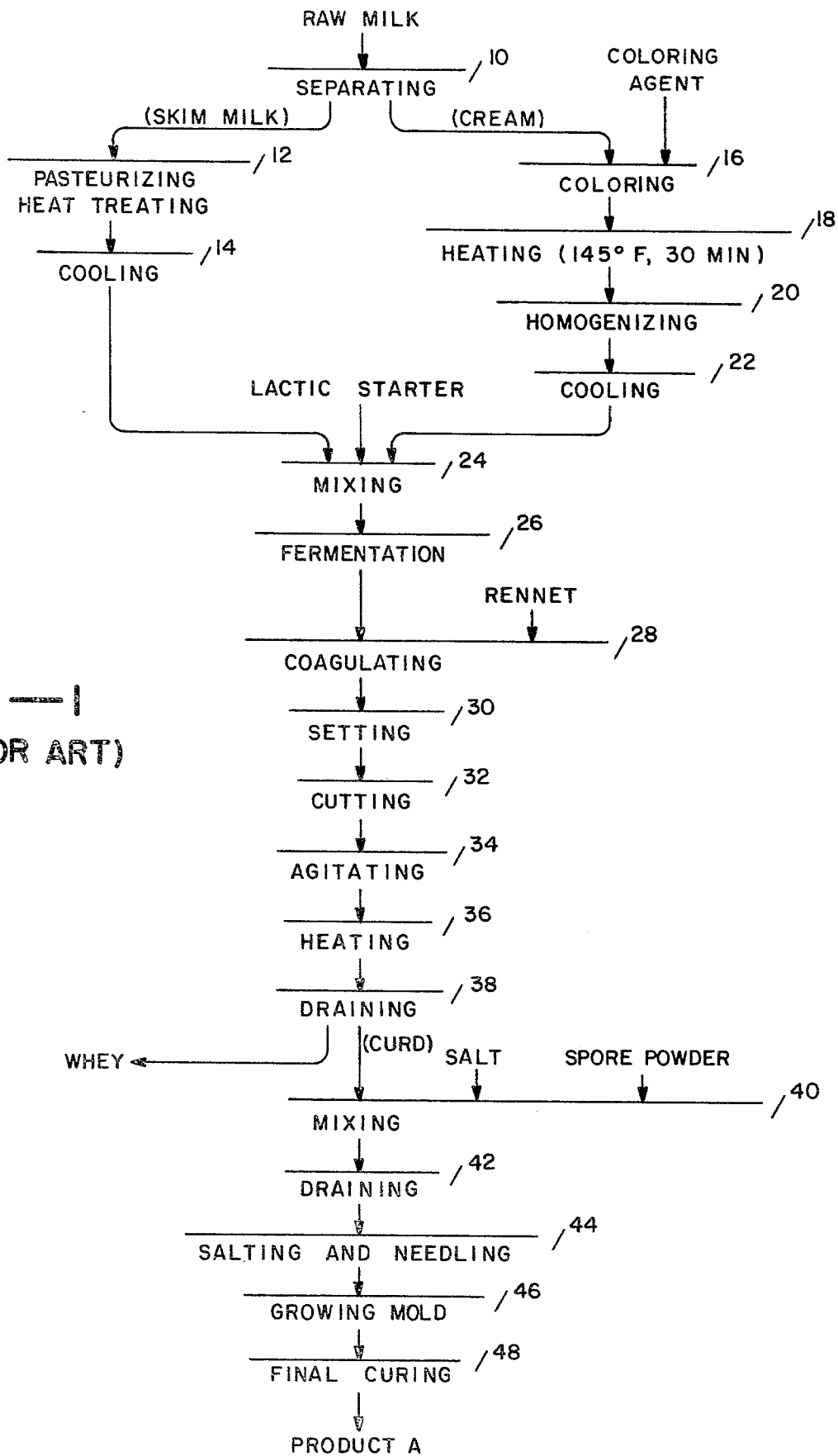
FIG.—1
(PRIOR ART)

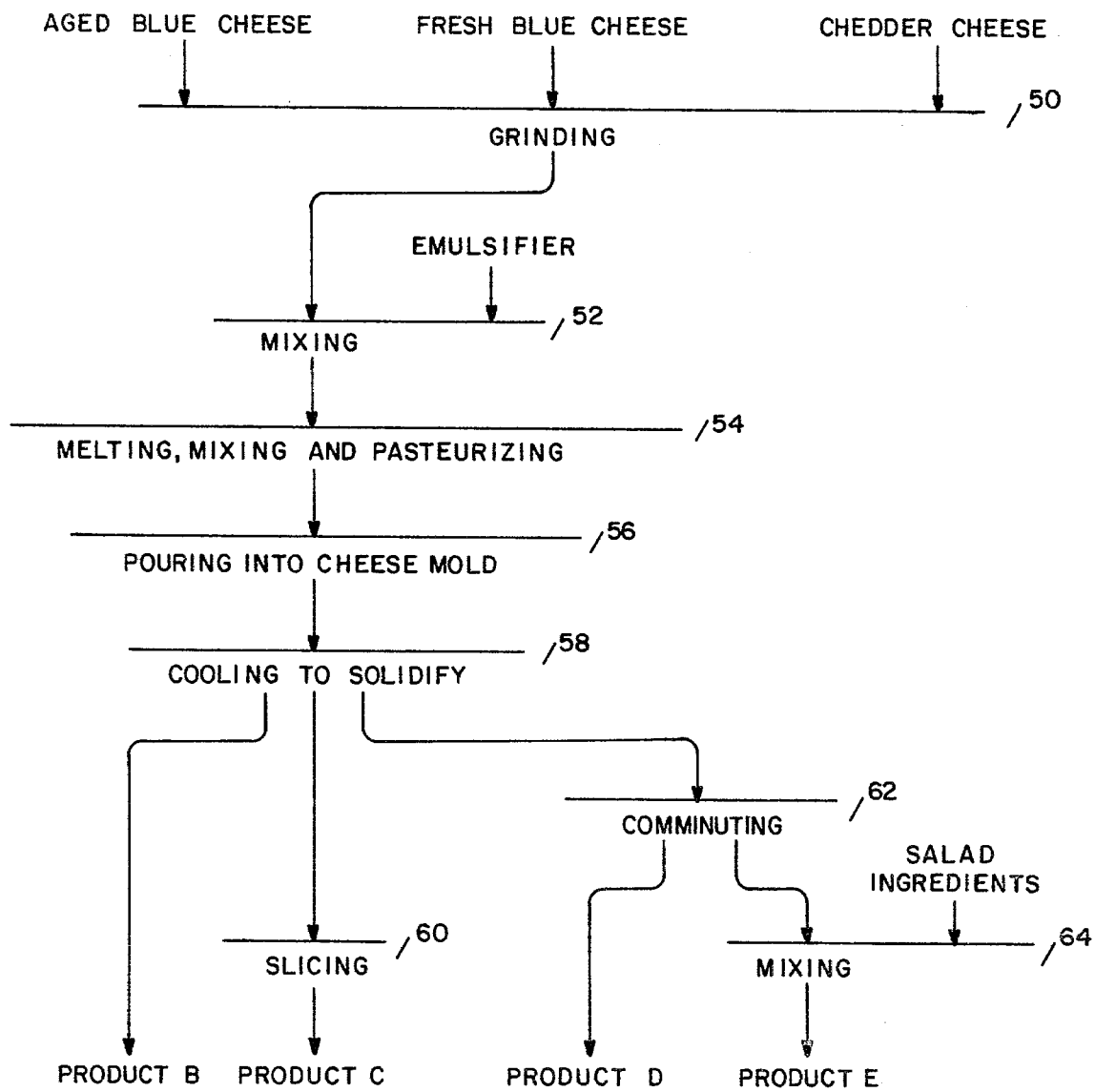
FIG.—2

4,248,897

PROCESSED BLUE CHEESE BLEND AND METHOD OF FORMATION

BACKGROUND OF THE INVENTION

It is known that aged blue cheese is subject to a relatively short refrigerated shelf-life of on the order of two to three weeks. This is primarily due to the presence of high levels of viable mold, yeast and bacteria in and/or on the surface of the cheese. While pasteurized processing of cheese such as cheddar is a common practice to yield a cheese with a low microbial count and extended shelf-life, preparation of pasteurized processed blue cheese has not been accomplished because the heat processing causes bitter off-flavors to develop.

One approach to this problem is set out in Noznick et al U.S. Pat. No. 3,097,950. There, blue cheese is mixed with an emulsifier in water at about a 40% solids level and heated to emulsify and pasteurize the cheese. The emulsion is then spray-dried. The patent states that the final product is devoid of off-flavors. However, it is known that spray-dried products lose a substantial amount of their volatiles and consequently the final product does not possess the odor and flavor of the original blue cheese. In addition, such spray-dried product does not have the consistency and body of the original blue cheese.

OBJECTS AND SUMMARY OF THE INVENTION

The present invention relates to a heat processed blue cheese blend.

It is an object of the invention to provide a method for forming a processed blue cheese of improved refrigerated shelf-life without a bitter taste.

It is a particular object of the invention to provide an economical process of the foregoing type which includes as an ingredient a relatively fresh or unaged, blue cheese.

It is another object of the invention to provide a processed blue cheese of the foregoing type suitable for mixing in comminuted form with salad dressing ingredients to form a salad dressing.

In accordance with the present invention, a fully aged first blue cheese portion is blended with a substantially current second blue cheese portion and the blend is melted together with emulsifying salts at a cheese pasteurizing temperature. Thereafter, the molten cheese is solidified and used as a blue cheese product by itself or as a salad dressing ingredient. Prior to mixing, the first cheese portion is fully aged, as for at least about 60 days; while the second cheese portion is aged for a time sufficient to begin mold growth but less than about 30 days and preferably less than 10 days. A suitable ratio of the first to second cheese portions is from about 0.3 to 1.5 parts by weight of the former to about 1 part by weight of the latter. Cheddar cheese may be mixed with such cheese blend prior to heat processing which serve to give a variety of flavors.

Further objects and features of the invention will be apparent from the following description taken in conjunction with the accompanying drawings.

BRIEF DESCRIPTION OF THE DRAWINGS

FIG. 1 is a schematic flow diagram illustrating a conventional method for the formation of aged blue cheese.

FIG. 2 is a schematic flow diagram of processing the cheese of FIG. 1 as one ingredient in the present invention.

DETAILED DESCRIPTION OF THE PREFERRED EMBODIMENTS

The present invention relates to the heat processing of a blend of aged blue cheese and current mold-ripenable blue cheese to pasteurize the blend in molten form which forms a final product of improved refrigerated shelf-life and without substantial off-flavor. The present description will first refer to conventional cheese processing for forming the mold-ripened cheese ingredients of the above process.

In general, the present method is applicable to all the blue mold ripened cheeses such as blue cheese, Roquefort cheese, Stilton cheese, and Gorgonzola cheese. As defined herein, "blue cheese" refers to all of such cheeses.

Blue cheese is normally produced in round, wheel form containing 4–5% salt and possessing a flavor associated with certain free fatty acids and ketones. A typical analysis of blue cheese is 28.9% fat, 42.4% moisture, 21.4% protein, 4.0% salt and 5.1% ash. At the present time, the Federal standards of identity state that blue cheese must contain at least 50% milk fat in the dry solids and not more than 46% moisture. (For the present application, percentages refer to weight percent).

Referring to FIG. 1, a process described in the literature for the production of blue cheese is illustrated. The combination of steps 10 through 18 are referred to in the industry as setting the milk.

In step 10, raw milk is separated by conventional means into a skim milk fraction and a cream fraction. In step 12, the skim milk fraction is heat treated at a temperature of about 145° F. for about 30 seconds. In step 12, the heat treated skim milk is cooled to about 86° F. and pumped to a cheese vat.

The cream fraction from step 10 may be colored white by the addition of a conventional coloring agent in step 16. In step 18, the cream is heated at 145° F. for about 30 minutes. Then, in step 20, the cream is homogenized, typically in two stages. In step 22, the cream is cooled to a temperature of 86° F. and thereafter added to the cheese vat along with the skim milk.

In step 24, the heat treated skim milk and homogenized cream are mixed in proportion to give cheese with a 50% fat, dry basis, together with a lactic starter, typically 0.5% by weight. Then in step 26, the mixture is held for about 1 hour to permit fermentation to proceed. Thereafter, in step 28, single strength rennet extract is added to the milk at a concentration of about 72 ml per 1,000 pounds of milk. The milk is mixed for about 3 minutes and allowed to set for about 30 minutes to cause coagulation of the cheese curd.

The next sequence of procedures (steps 32 through 38) are known as "curd management". In step 32, when the curd has drawn from the sides of the vat and is firm, the curd is cut into about 0.625" cubes. Then, in step 34, the curd is agitated gently until the titratable acidity rises from about 0.11% to 0.14%. Typically, this occurs in about 1 hour. Thereafter, in step 36, the product is heated to about 92° F. for about 2 minutes to expel whey and firm the curd cubes. Then, in step 38, the whey is drained from the curd by conventional techniques.

In step 40, the separated curd is inoculated with mild spores. Salt (2 pounds per 100 pounds of curd) is added together with a spore powder, typically P. roqueforti, at a concentration of 1 ounce per 100 pounds of curd. Then, in step 42, the curd is scooped into perforated circular stainless steel blue cheese molds and the curd is drained. The hoops are turned about every 15 minutes for the first 6-12 hours and then the curd is drained overnight.

In step 44, the drained curd from step 42 is removed from the blue cheese mold, typically in a 5 pound wheel, and the surface is covered with salt, typically at a concentration of 0.03 lbs. salt per pound of curd. Then, the wheels are placed on wooden cradles and maintained in a 50°-55° F., 95% relative humidity room. Salting at the above concentration is repeated daily for 4 additional times. Then, 50 holes per wheel are made as with an ice pick or needling machine to assist mold penetration.

In step 46, the mold is permitted to grow. This is accomplished by placing the perforated cheese wheels in cradles again, maintained at about 48°-55° F. at 95% relative humidity for about 25-35 days. Mold growth is essentially completed in this step.

In step 48, the final curing or aging and storage of the cheese occurs. Here, the surfaces of the cheese wheels are cleaned, and the wheels wrapped in foil and maintained at about 35°-40° F. and preferably for a minimum of 30 days duration and typically 30 to 45 days for full flavor development. Then, the foil is removed, the surface is cleaned, and rewrapped in foil. The total aging for steps 46 and 48 should be at least 60 days. Only limited oxygen contact is permitted during step 48, and so the enzymes are the predominant active agent rather than mold growth. The blue cheese produced in step 48 is fully aged and designated Product A.

Product A is conventionally sold in a number of different forms. Much of the blue cheese is used in the manufacture of blue cheese salad dressing. The dressing typically has a shelf-life of 2-3 weeks at 45° F. after opening. In addition, limited amounts of refrigerated blue cheese wedges or crumbled blue cheese are sold.

In accordance with the present invention, a heat processed mold-ripened or aged blue cheese is formed by blending cheeses with different degrees of aging. Referring to FIG. 2, in step 50, in the first step, the fully aged blue cheese, Product A formed as illustrated in FIG. 1, is mixed with a fresh blue cheese. The cheeses may be blended by grinding each one to a suitable size for intimate interdispersion.

The aged blue cheese ingredient is typically aged under the foregoing conventional conditions set out in steps 46 and 48. The aging time should be sufficient for essentially complete mold growth for the desired taste characteristics of a conventional fully aged blue cheese.

The other essential blending component of step 50 is a substantially current mold-ripenable blue cheese designated fresh blue cheese. That product may be formed by the foregoing general conventional technique through step 44. Thereafter, it is subjected to an abbreviated mold growth period at the temperatures of step 46 sufficient to commence the growth of mold but not to complete such mold growth. A minimum aging time for this cheese is on the order of 5 days, while a maximum aging time is on the order of 30 days. Preferably, said aging is for less than 10 days, e.g., 6 to 7 days.

The proportion of aged blue cheese to fresh blue cheese is adjusted to accomplish the following objectives. Sufficient aged blue cheese must be present to provide the desired mold-ripened cheese flavor and other characteristics. On the other hand, sufficient fresh blue cheese must be present to permit heat processing of the mixture without off-flavor to produce a shelf-stable refrigerated product. It has been found that a ratio of aged to fresh cheese on the order of from about 0.3 to 1.5 parts by weight of the former to 1 part by weight of the latter will give a proper flavor and body. A preferable range is from 0.4 to 0.8 parts of the former to 1 part of the latter. This may vary depending on the aging of the fresh and aged blue cheeses. For example, using less aged cheese will give a milder cheese and firmer texture.

If desired, cheddar cheese may be added as during step 50 for the purpose of flavor variety. In this instance, from 0.2 to 2.0 parts of cheddar cheese per 1 part of aged blue cheese may be employed.

Emulsifiers are added to the cheese blend to avoid the separation of fats and oils during melting. They may be of the type conventionally used for the heat processing of other cheeses. For example, they may include the alkali melt salts of food grade acids such as citric or phosphate. Particularly suitable emulsifiers include sodium citrate, alone or in combination with di- or trisodium phosphate or sodium hexametaphosphate. The emulsifier may be added during dry blending of the solid cheeses or after melting of the cheeses.

After mixing, the foregoing cheese blend including emulsifier is melted as in a steam jacketed continuous cooker mixer at pasteurizing temperatures. During this step, the cheese blend is continuously mixed in a molten state and retained at temperatures of from 155° F. to 170° F., and preferably from about 160°-165° F. for sufficient time to lower the microbial count to a level at which refrigeration shelf-life is substantially increased. A typical time for this purpose is from 2 to 5 minutes.

To determine that the proper heat treatment has occurred, a phosphatase test may be run by the FDA approved method. The product should show a phenol equivalent of not more than 3 micrograms of phenol for 0.25 grams of processed cheese.

In step 56, the molten cheese blend from step 54 is poured into a cheese mold, suitably of the 5-pound size. Then, in step 58, the cheese is cooled in the mold to a solid mass.

The product from step 58, designated Product B, is a heat processed blue cheese loaf blend of a fully aged blue cheese and a substantially current blue cheese. It includes inactivated blue cheese mold dispersed uniformly throughout said blend without visible veins. It is characterized by blue cheese flavor without significant off-flavor. It has an extended refrigeration shelf-life of at least several months in comparison to two to three weeks for conventional blue cheese. An additional advantage of the product is that it includes a substantial quantity of fresh or current cheese which avoids the relatively expensive step of long-term aging.

While Product B from step 58 may be shipped in bulk or loaf form, as for institutional use, it may be converted to other forms. For example, it may be sliced as in step 60 to form Product C, e.g., a blue cheese wedge or thin slices, to be sold to the consumer. The thin slices could be used for sandwiches or snacks. Also they may be melted as a topping for a cheeseburger without the off-flavor of melting unprocessed blue cheese.

In another alternative (step 62), the loaf may be comminuted to a crumbled blue cheese form to be sold for consumer, institutional or industrial use as crumbled Product D.

In step 64, the comminuted blue cheese is mixed with salad oil and other salad ingredients to form a blue cheese salad dressing, designated Product E. Suitable ingredients are mayonnaise, processed blue cheese, vinegar and salt.

A further disclosure of the nature of the present invention is provided by the following specific examples of the practice of the invention. It should be understood that the data disclosed serve only as examples and are not intended to limit the scope of the invention.

EXAMPLE 1

TABLE 1

| Ingredients | Pounds |
| --- | --- |
| Aged Blue Cheese | 65 |
| Current Blue Cheese | 50 |
| White Cheddar Cheese | 100 |
| Sodium Citrate | 3 |
| Disodium Phosphate | 3 |
| Trisodium Phosphate | 1 |

Aged blue cheese is formed as set out in the process of FIG. 1 aged for 30 days at 50° to 55° F. (step 46) and for 30 additional days during final flavor development storage at about 36° F. (step 48). The current blue cheese is aged for approximately 5 days at 50°-55° F. All cheeses were ground and mixed with the emulsifying salts and melted and pasteurized in a cooker mixer for 2 minutes at 160° F. The product was then cooled to solid form. It was analyzed as 50.0% fat (dry basis), 27.5% nonfat solids, and 45.0% moisture. It was characterized by a mild blue cheese flavor with no bitter off-flavor.

EXAMPLE 2

TABLE 2

| Ingredient | Pounds |
| --- | --- |
| Aged Blue Cheese | 65 |
| Current Blue Cheese | 150 |
| Sodium Citrate | 7 |
| Sodium Hexametaphosphate | 1 |

This product was formed as in Example 1. It had an analysis of 47.5% fat (dry basis), 26% nonfat solids, and 47.5% moisture. It was characterized by a mild taste in loaf form without bitterness. It developed a fuller more mature blue cheese taste and aroma when crumbled.

EXAMPLE 3

TABLE 3

| Ingredient | Pounds |
| --- | --- |
| Aged Blue Cheese | 40 |
| Current Blue Cheese | 75 |
| White Cheddar Cheese | 100 |
| Sodium Citrate | 5 |
| Trisodium Phosphate | 1 |
| Sodium Hexametaphosphate | 1 |

This product was processed as in Example 1. The final product had an analysis of 47.2% fat (dry basis), 27.5% nonfat solids and 44% moisture content. It was characterized by a very mild blue cheese flavor with no bitterness.

EXAMPLE 4

The product of Example 2 in crumbled form was mixed with a salad dressing formula of the following ingredients:

TABLE 4

| Ingredients | Percent |
| --- | --- |
| Mayonnaise | 84 |
| Crumbled Processed Blue Cheese | 12 |
| Vinegar | 2.5 |
| Salt | 1.5 |

The foregoing ingredients are mixed to form a salad dressing similar to a conventional blue cheese salad dressing but had an extended refrigeration shelf-life.

What is claimed is:

1. In a method for forming a processed blue cheese blend, the steps of blending and heating a mold-ripened first blue cheese portion, pre-aged for at least 60 days, with a substantially current mold-ripenable second blue cheese portion, pre-aged for a time no greater than about 10 days, in the presence of an emulsifier, to form a cheese blend, said heating being performed at a pasteurizing temperature for said cheese blend with said cheese blend being in molten form, the ratio of said first blue cheese portion to said second blue cheese portion being from about 0.3 to 1.5 parts by weight of the former to 1 part by weight of the latter, and thereafter solidifying said molten cheese blend by cooling.

2. The method of claim 1 in which said molten cheese blend is solidified by cooling.

3. The method of claim 2 in which said solidified processed cheese blend is comminuted and mixed with salad ingredients to form a salad dressing.

4. The method of claim 1 in which said first and second cheese portions in comminuted solid form are pre-mixed with emulsifier prior to heating to molten form without substantial aqueous dilution.

5. The method of claim 1 in which cheddar cheese is mixed with said first and second cheese portions prior to blending and heat processing.

6. The method of claim 1 in which the cheese portion of said processed blue cheese blend consists essentially of said first and second blue cheese portions.

7. A pasteurized processed blue cheese blend of a fully aged blue cheese portion, pre-aged for at least sixty days prior to blending, and a substantially current second blue cheese portion, pre-aged for a time no greater than about 10 days prior to blending, together with emulsifier, said blue cheese blend including inactivated blue cheese mold dispersed uniformly throughout said blend without visible veins, the ratio of said first blue cheese portion to said second blue cheese portion being from about 0.3 to 1.5 parts by weight of the former to 1 part by weight of the latter, said cheese blend being characterized by having been blended in a molten condition and possessing an extended refrigerated shelf-life without significant off-flavor.

8. The blue cheese blend of claim 7 in which said molten cheese blend is solidified by cooling.

9. A salad dressing comprising the blue cheese blend of claim 7 in comminuted form and salad dressing liquids.

10. The blue cheese blend of claim 7 in which the cheese portion consists essentially of said first and second blue cheese portions.

* * * * *

UNITED STATES PATENT AND TRADEMARK OFFICE
CERTIFICATE OF CORRECTION

PATENT NO. : 4,248,897
DATED : February 3, 1981
INVENTOR(S) : Lyle R. Christensen et al.

It is certified that error appears in the above—identified patent and that said Letters Patent is hereby corrected as shown below:

On The Title Page Item (75), "Ocrel M. Russel" should read

-- Ocrel M. Russell --.

Signed and Sealed this

Fifth Day of January 1982

[SEAL]

Attest:

Attesting Officer

GERALD J. MOSSINGHOFF
Commissioner of Patents and Trademarks